(12) United States Patent
Lipcsei et al.

(10) Patent No.: US 7,304,866 B2
(45) Date of Patent: Dec. 4, 2007

(54) SYSTEM AND METHOD FOR POWER CONVERTER SWITCH CONTROL

(75) Inventors: Laszlo Lipcsei, San Jose, CA (US); Catalin Popovici, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 228 days.

(21) Appl. No.: 10/775,275

(22) Filed: Feb. 10, 2004

(65) Prior Publication Data

US 2005/0174809 A1  Aug. 11, 2005

(51) Int. Cl.
 *H02M 3/335* (2006.01)
 *H02M 3/22* (2006.01)
(52) U.S. Cl. .............................. 363/16; 363/15; 363/17
(58) Field of Classification Search ................... 363/16, 363/15, 17, 24–25, 131–134
See application file for complete search history.

(56) References Cited

U.S. PATENT DOCUMENTS

2004/0100805 A1* 5/2004 Wei et al. ..................... 363/16
2004/0246748 A1* 12/2004 Xu et al. ....................... 363/17

* cited by examiner

*Primary Examiner*—Karl Easthom
*Assistant Examiner*—Richard V. Muralidar
(74) *Attorney, Agent, or Firm*—Grossman, Tucker, Perreault & Pfleger, PLLC

(57) ABSTRACT

A power converter includes a transformer having a primary winding and a secondary winding, and a plurality of switches coupled to the primary and secondary winding, the plurality of switches responsive to at least one control signal to short both the primary and secondary winding during a first reset time interval. An electronic device including such a power converter and related methods are also provided. A power converter having a plurality of DC to DC converters coupled in parallel is also provided.

6 Claims, 6 Drawing Sheets

SYSTEM AND METHOD FOR POWER CONVERTER SWITCH CONTROL

FIELD

This disclosure relates to power converters, and more particularly to DC to DC converters.

BACKGROUND

A DC to DC converter may be used in a variety of electronic devices to convert an input DC voltage to an output DC voltage. One DC to DC converter may have a transformer based full bridge primary and a current doubler rectifier secondary topology. In this instance, a full bridge circuit may be coupled across a primary winding of an isolation transformer and a current doubler rectifier circuit may be coupled across a secondary winding of the isolation transformer. The full bridge circuit may have four switches arranged in known bridge configuration. The current doubler rectifier may have two switches.

In one known arrangement, the four switches of the full bridge circuit may be controlled by four separate control signals and the two switches of the current doubler rectifier circuit may be controlled by an additional two control signals. Thus, six different control signals are required in this known arrangement. In addition, six switches may be responsive to these six associated control signals such that before each power transfer cycle, the secondary winding is shorted, but the primary winding is left open (the four switches of the full bridge are open). This known arrangement therefore requires a relatively larger core size for the transformer since for each cycle on the magnetization curve, the core will almost be brought back to the initial state where the core is not magnetized.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
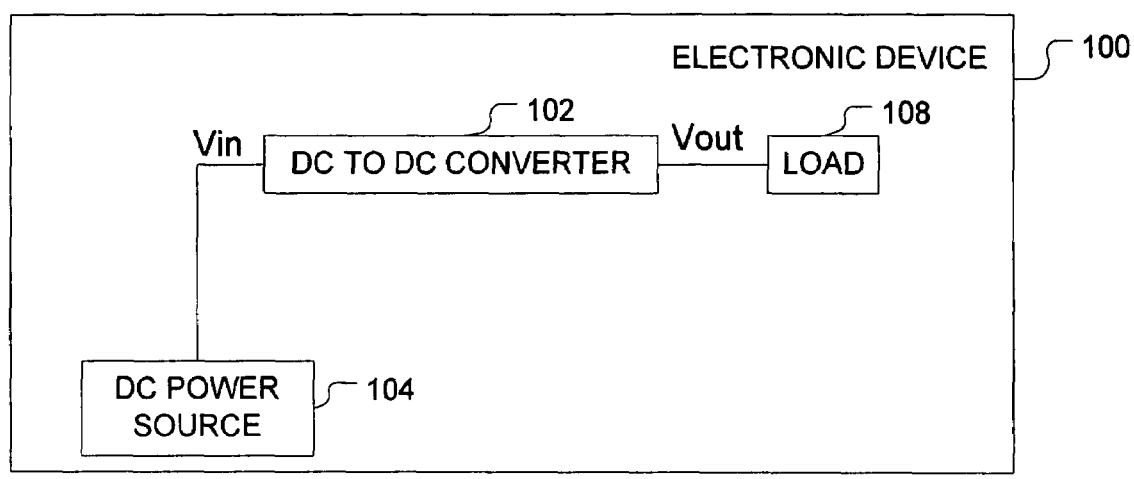
FIG. 1 is a block diagram of an electronic device having a DC to DC converter consistent with an embodiment.

FIG. 1 illustrates an electronic device 100 having a power converter, e.g., a DC to DC converter 102 consistent with an embodiment. The electronic device 100 may be any variety of electronic devices, including, but not limited to, a server computer, a desk top computer, a lap top computer, cell phone, personal digital assistant, etc. The electronic device 100 may receive power from any variety of power sources such as a DC power source 104. The DC power source may be any variety of power sources such as, for example, an AC/DC adapter, a DC "cigarette" type adapter, a battery, or a rechargeable battery. A rechargeable battery may include any type of rechargeable battery such as lithium-ion, nickel-cadmium, nickel-metal hydride batteries, or the like. The DC to DC converter 102 may receive a DC input voltage, Vin, and provide an output DC voltage, Vout, to a load 108. The output voltage, Vout, provided by the DC to DC converter 102 may be higher or lower than the input voltage Vin.

Figure 2:
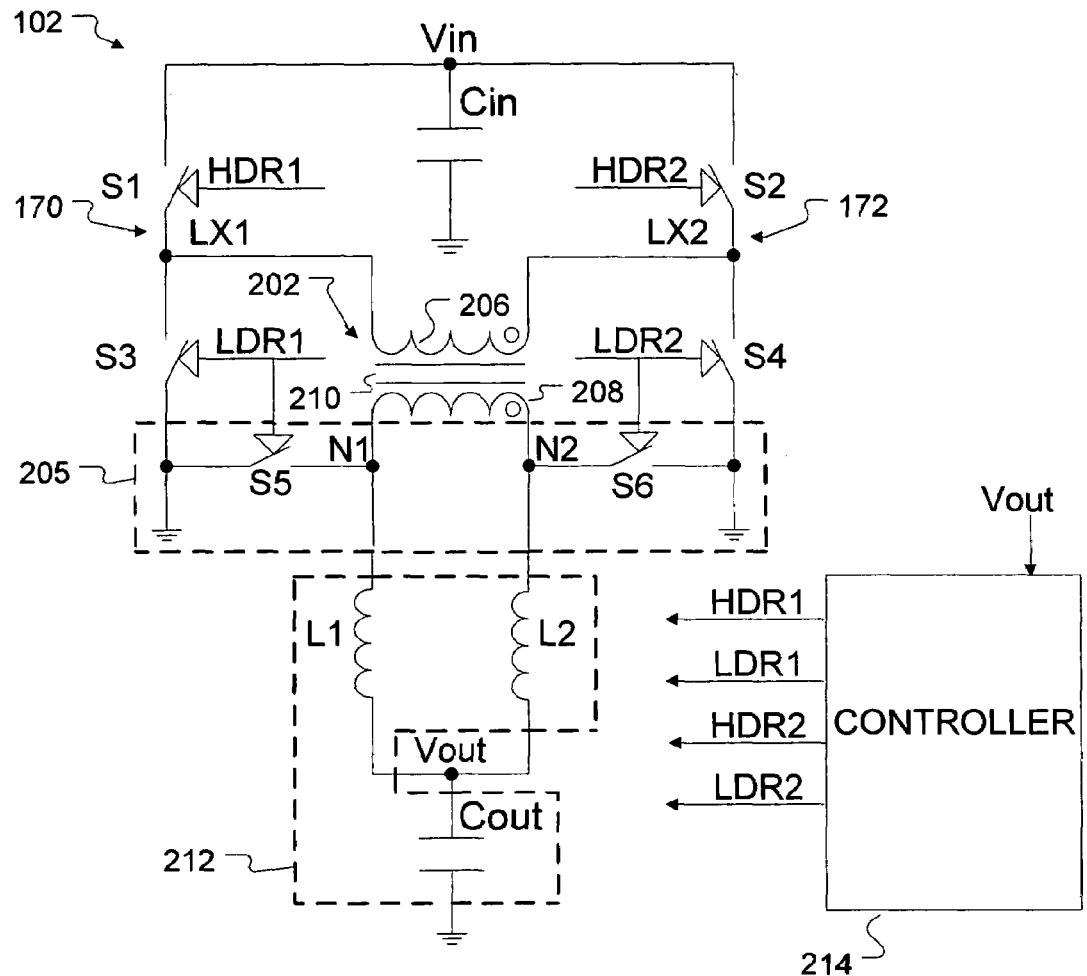
FIG. 2 is a circuit diagram of one embodiment for the DC to DC converter of FIG. 1.

FIG. 2 illustrates a circuit diagram of one embodiment of the DC to DC converter 102 of FIG. 1 in more detail. In general, the DC to DC converter 102 receives an input DC voltage, Vin, and provides a desired output DC voltage, Vout. The DC to DC converter 102 may include a transformer 202, a full bridge circuit, a rectifier circuit 205, and an output filter 212. The transformer 202 may have a primary winding 206, a secondary winding 208 and a core 210. The full bridge circuit may have a pair of paths 170, 172. Path 170 may also have a high side switch S1 and a low side switch S3 coupled in series. Path 170 may have a node LX1 coupled between switches S1 and S3. The high side switch S1 of path 170 may be coupled between an input voltage terminal and node LX1, while the low side switch S3 of path 170 may be coupled between node LX1 and ground. Similarly, path 172 of the full bridge circuit may have a high side switch S2 and a low side switch S4 coupled in series and have a node LX2 coupled between switches S2 and S4. The primary winding 206 of the transformer 202 may be coupled to nodes LX1 and LX2 of the full bridge circuit. The rectifier circuit 205 may be a current doubler rectifier circuit having switches S5, S6 coupled across the secondary winding 208 of the transformer 202. Switch S5 may be coupled between node N1 and ground while switch S6 may be coupled between node N2 and ground. The output filter 212 may include inductors L1, L2 and capacitor Cout.

A controller 214 may provide control signals HDR1, LDR1, HDR2, and LDR2 to the various switches S1, S2, S3, S4, S5, and S6. The switches S1 through S6 may be realized by any variety of transistors including bipolar and field effect transistors. In one embodiment, metal oxide semiconductor field effect transistors (MOSFETs) may be utilized. The controller 214 may also accept a signal from the DC to DC converter 102 representative of the output voltage Vout of the DC to DC converter and make switching decisions based, at least in part, on such signal.

Advantageously, control signal LDR1 may be provided to both the low side switch S3 of path 170 of the full bridge circuit and to switch S5 of the rectifier circuit 205 in order to simultaneously drive switches S3 and S5. In addition, control signal LDR2 may be provided to both the low side switch S4 of path 172 of the full bridge circuit and to switch S6 of the rectifier circuit 205 in order to simultaneously drive switches S4 and S6. As such, only four control signals HDR1, LDR1, HDR2, and LDR2 are necessary to control operation of all six switches S1 through S6.

Figure 3:
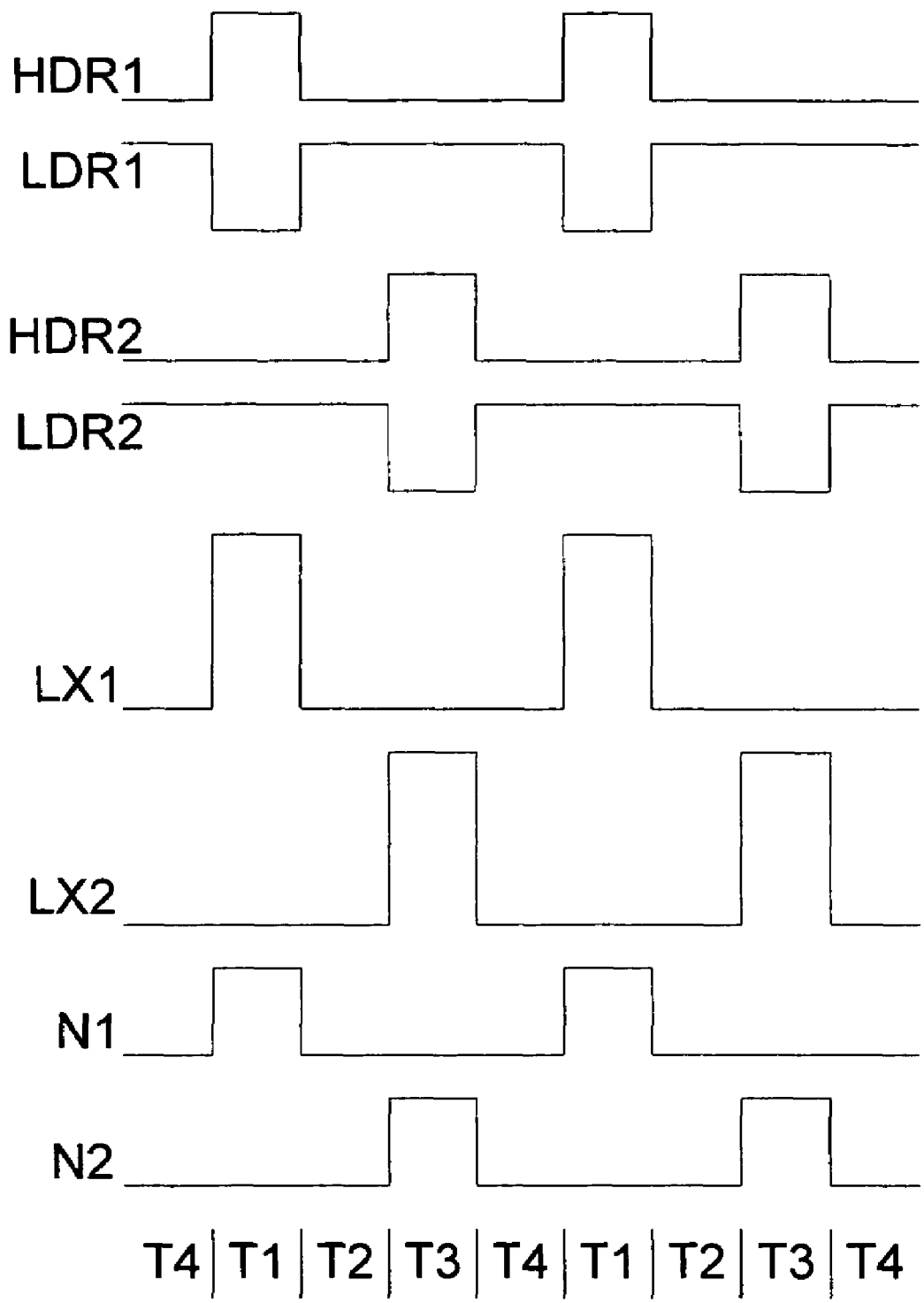
FIG. 3 is a timing diagram for the DC to DC converter of FIG. 2.

FIG. 3 illustrates a timing diagram for the control signals HDR1, LDR1, HDR2, and LDR2 provided to the switches S1 through S6 of the DC to DC converter of FIG. 2 to further detail operation of the DC to DC converter. FIG. 3 also illustrates exemplary voltage levels at various nodes LX1, LX2, N1, and N2 of the DC to DC converter 102 of FIG. 2 during various time intervals T1, T2, T3, and T4. In general, when an associated control signal for an associated switch is "high" the switch is ON and accordingly conducts current.

In contrast, when an associated control signal for an associated switch is "low" the switch is OFF and accordingly does not conduct current. Those skilled in the art will also recognize other switch and control signal configurations where alternative switches may be responsive to alternative control signals.

During time interval T1, control signal HDR1 may be high, control signals LDR1 and HDR2 may be low, while control signal LDR2 may be high. In response to such control signals, switch S1 may be ON, switches S3 and S5 may be OFF, switch S2 may be OFF, and switches S4 and S6 may be ON. Therefore during time interval T1, node LX1 may be connected to the input DC voltage Vin through closed switch S1 and node LX2 may be connected to ground through closed switch S4. As such, node LX1 may have a voltage level associated with Vin while node LX2 may have a zero voltage level. Node N1 may have a voltage level associated with the voltage level at node LX1 due to the voltage level induced in the secondary winding 206 because of the current flowing in the primary winding 206. The relative voltage level at node N1 compared to the voltage at node LX1 during time interval T1 depends on the type of transformer 202. For a step down transformer delivering a lower output voltage Vout than input voltage Vin, the voltage level at node N1 during time interval T1 may be less than the voltage level at node LX1 as illustrated in FIG. 3.

Also during time interval T1, node N2, together with the corresponding side of the secondary winding 208, may be connected to ground through closed switch S6. As such, node N2 may have a zero voltage level during time interval T1. Therefore, during time interval T1 power may be transferred during this first power transfer time interval from the input voltage Vin via switch S1 and node LX1 to the primary winding 208, induced on the secondary winding 208 and visible at node N1.

During time interval T2, control signal HDR1 may be low, control signal LDR1 may be high, control signal HDR2 may be low, while control signal LDR2 may be high. In response to such control signals, switch S1 may be OFF, switches S3 and S5 may be ON, switch S2 may be OFF, and switches S4 and S6 may be ON. Advantageously, the primary winding 206 and the secondary winding 208 of the transformer 202 are both shorted during this time interval T2, which may be referred to herein as a reset time interval. As used herein, a "short" means a contract between two points in a circuit having a potential difference. In one embodiment, the primary winding 206 may be shorted by coupling the primary winding to a ground terminal, either directly to a ground terminal as in FIG. 2 or indirectly via a resistor Rsense as in FIG. 5.

In the embodiment of FIG. 2, the primary winding 206 may be shorted since both nodes LX1 and LX2 are coupled to ground via closed switches S3 and S4 (whiles switches S1 and S2 are open). The secondary winding 208 may also be shorted via closed switches S5 and S6. Since both the primary and secondary windings 206, 208 are shorted during this time interval T2, the energy stored in the transformer core 210 may be more fully preserved compared to shorting only the secondary winding 208 and leaving the primary winding 206 open as may be done in one embodiment of the prior art. Hence, a relatively smaller core size may be achieved. In addition, the nodes LX1, LX2, N1, and N2 may all have a zero voltage level during this reset time interval T2 given the state of switches S1 through S6.

Time interval T3 may be a second power transfer time period in which generally the state of switches S1, S4 and switches S2, S3 are alternated to apply opposite polarities of the input DC voltage Vin across the primary winding 206 of the transformer 202. For instance, during time interval T3 control signal HDR1 may be low, control signal LDR1 may be high, control signal HDR2 may be high, while control signal LDR2 may be low. In response to such control signals, switch S1 may be OFF, switches S3 and S5 may be ON, switch S2 may be ON, and switches S4 and S6 may be OFF. As such, node LX2 may have a voltage level associated with Vin while node LX1 may have a zero voltage level. Node N2 may have a voltage level associated with the voltage level at node LX2 due to the voltage level induced in the secondary winding 208 because of the current flowing in the primary winding 206. The relative voltage level at node N2 compared to the voltage at node LX2 during time interval T3 depends on the type of transformer 202. For a step down transformer, the voltage level at node N2 during time interval T3 may be less than the voltage level at node LX2 as illustrated in FIG. 3.

Also during time interval T3, node N1, together with the corresponding side of the secondary winding 208, may be connected to ground through closed switch S5. As such, node N1 may have a zero voltage level during time interval T3. Therefore, during time interval T3 power may be transferred during this second power transfer time interval from the input voltage Vin via switch S2 and node LX2 to the primary winding 206, induced on the secondary winding 208 and visible at node N2.

Finally, time interval T4 may be similar to the earlier detailed time interval T2. That is, control signal HDR1 may be low, control signal LDR1 may be high, control signal HDR2 may be low, while control signal LDR2 may be high. In response to such control signals, switch S1 may be OFF, switches S3 and S5 may be ON, switch S2 may be OFF, and switches S4 and S6 may be ON. Advantageously, the primary winding 206 and the secondary winding 208 of the transformer 202 may both be shorted during this time interval. T4 as earlier detailed regarding time interval T2. In addition, the nodes LX1, LX2, N1, and N2 may all have a zero voltage level during this reset time interval T4 given the state of switches S1 through S6.

Figure 4:
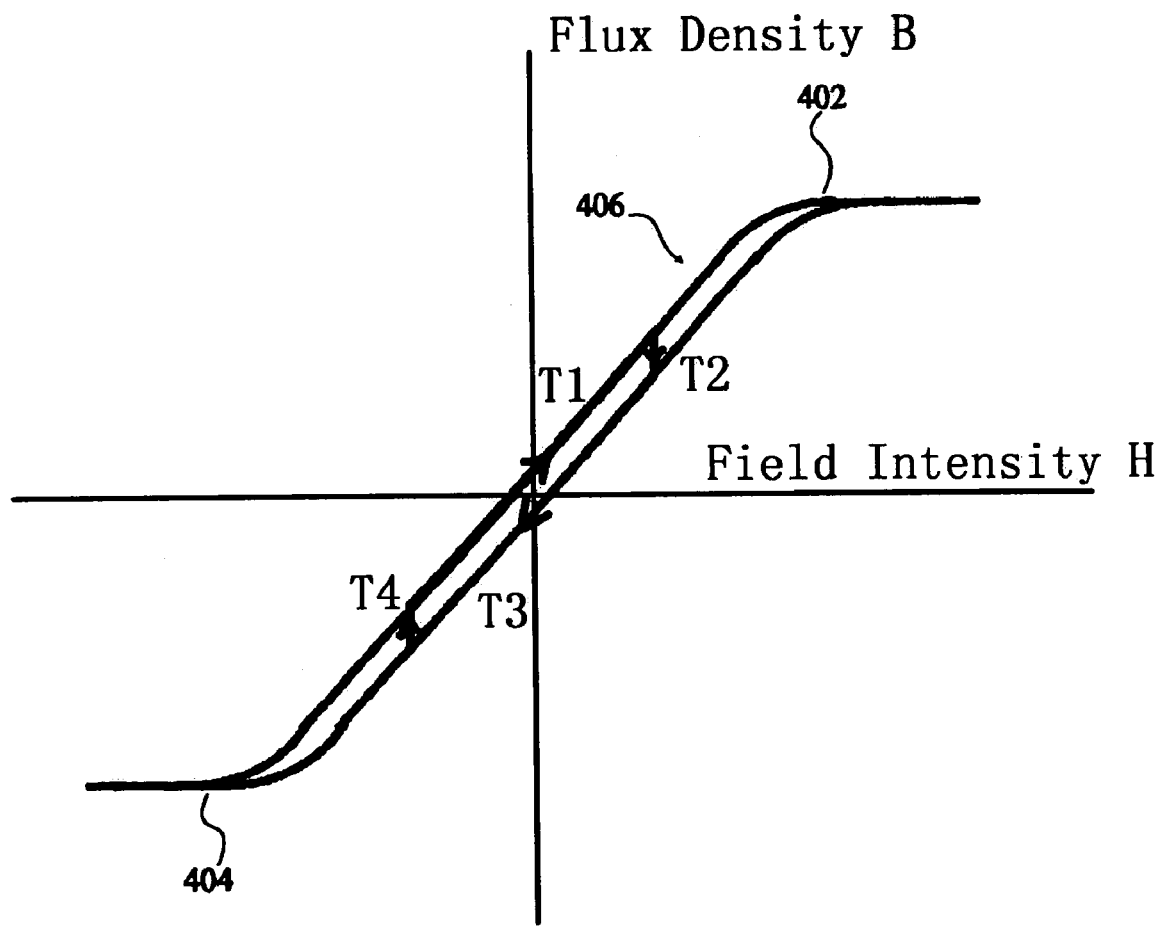
FIG. 4 is a plot of the core magnetization curve for the core of the transformer of FIG. 2.

FIG. 4 is an exemplary plot of the core magnetization curve for the core 210 of the transformer 202 of FIG; 2 plotting flux density (B) versus field intensity (H) for the core 210. The core reaches magnetic saturation at points 402, 404 on the hysteresis loop 406. Advantageously, before each power transfer cycle during times T1 and T3, the core maintains its magnetizing level from the previous cycle. For each cycle on the magnetization curve the core may start from a pre-charged value which may be discharged first (during time intervals T2 and T4) and then charged to the same level but in an opposite direction (during time intervals T1 and T3). In this way, the core is kept far from the saturation points 402, 404 with the operating point of the core 210 closer in proximity to zero on the B-H axis. As such, the physical size of the core 210 may advantageously be smaller than an embodiment in the prior art. In one example, by shorting both the primary and secondary winding the core energy conserved may be about 90% of maximum compared to about 60% of maximum when only the secondary winding is shorted. Therefore, the core size may decrease by about 30% in this example.

In addition to a reduced core size, the controller 214 for the DC to DC converter 102 need only provide four control signals HDR1, LDR1 and HDR2, LDR2. As illustrated in FIG. 3, control signals HDR1 and LDR1 have opposite phases during each time interval T1 through T4, e.g., control signal HDR1 is high when LDR1 is low and vice versa.

Control signals HDR2 and LDR2 also have opposite phases during each time interval. In addition, each pair of opposite phase control signals (HDR1/LDR1 and HDR2/LDRD2) may be separated by a certain time interval, e.g., equal to time interval T2 in one embodiment as shown in FIG. 3. Advantageously, a controller 214 to provide such signals HDR1, LDR1 and HDR2, LDR2 may be readily available and inexpensive. For instance, if the switches S1 to S6 are implemented as MOSFETs, a portion of such a controller 214 may be a dual MOSFET driver as is known in the art. For example, such a dual MOSFET driver may provide switch control signals to a buck converter in another application.

The operation of the power converter 102 of FIG. 2 may short both the primary 206 and secondary 208 winding of the transformer 210 during reset time intervals T2 and T4 to preserve core magnetization. The operation of the power converter of FIG. 2 with reference to the timing diagram of FIG. 3 illustrates one of many ways to short the primary 206 and secondary 208 winding during a reset time interval. For example, in another embodiment both high side switches S1 and S2 may short the primary winding by closing and providing a path to another terminal having a voltage level different than the voltage level of the primary winding. This and some other methods of shorting the primary and the secondary winding may not be able to utilize readily available, low cost dual MOSFET drivers if the switches S1 to S6 are MOSFET transistors.

Figure 5:
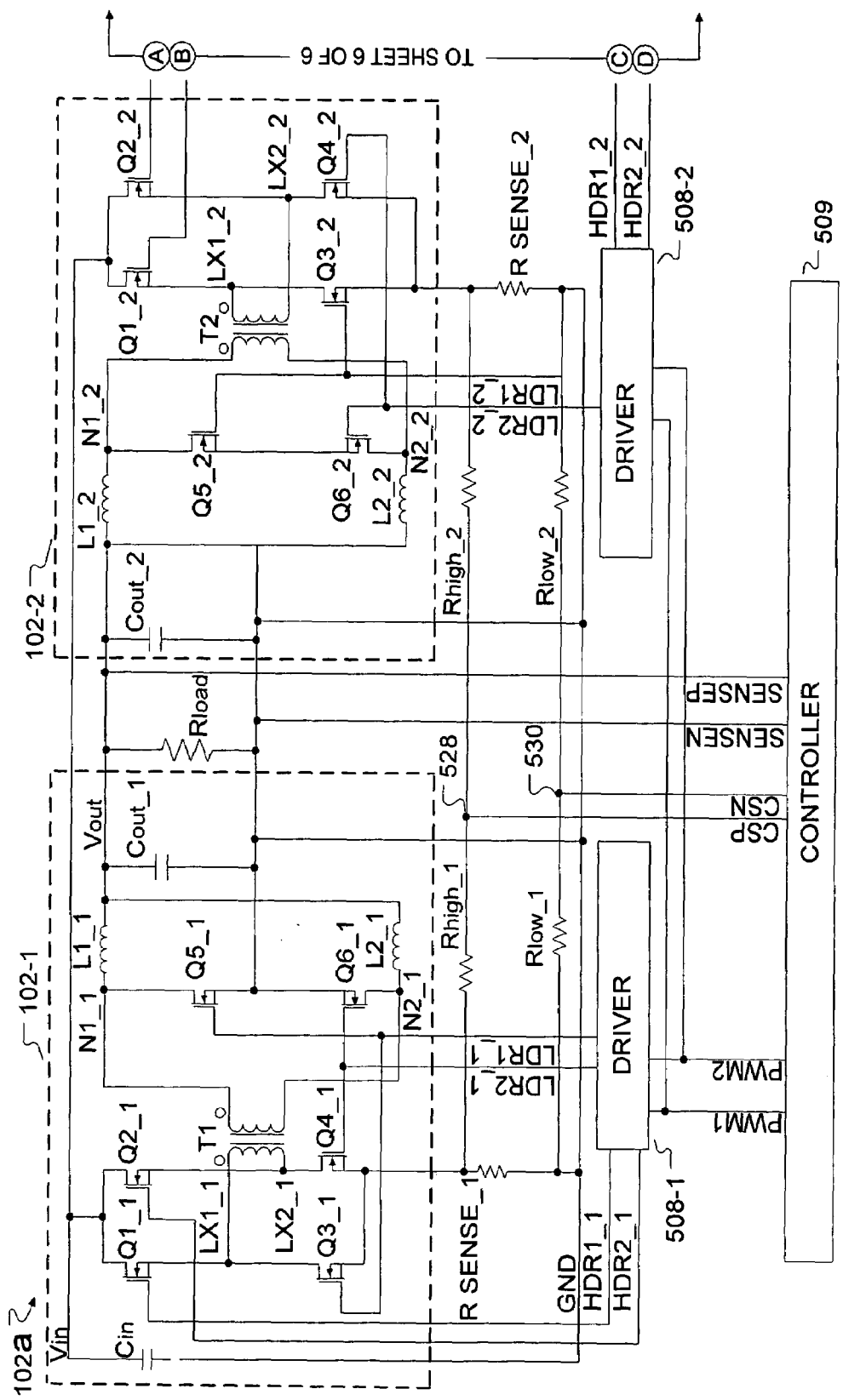
FIG. 5 is a circuit diagram of another embodiment of a DC to DC converter having a plurality of power units coupled in parallel.
Figure 5:
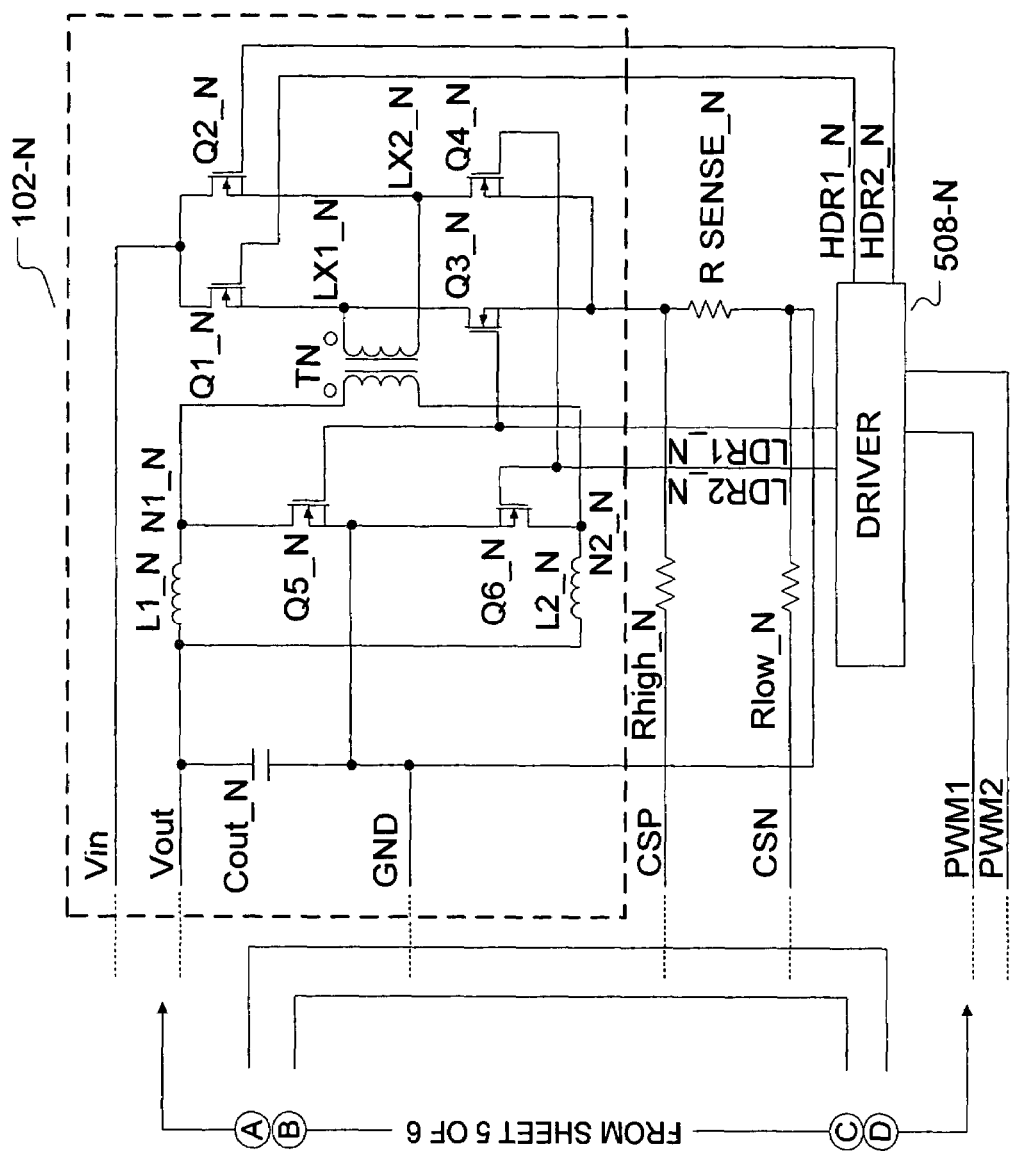

FIG. 5 illustrates another embodiment of a DC to DC converter 102a having a plurality of power units 102-1, 102-2 . . . 102-N. Each power unit 102-1, 102-2 . . . 102-N may be similar to the DC to DC converter 102 embodiment previously detailed in FIG. 2. Each power unit 102-1, 102-2 . . . 102-N may be coupled together in parallel. Each power unit may also have an associated driver 508-1, 508-2 . . . 508-N. In one embodiment, the drivers 508-1, 508-2 . . . 508-N may be dual MOSFET drivers. Each driver may receive the same pulse width modulated signals PWM1 and PWM2 from controller 509. Signals PWM1 and PWM2 may be generated by controller 509 based on a cycle-by-cycle peak current detection technique. Since the same PWM1 and PWM2 signals are provided to each driver 508-1, 508-2 . . . 508-N, there is an inherent balance between power units and N power units can be coupled in parallel without additional circuitry using the topology detailed in FIG. 5. That is, each additional power unit simply needs to couple its associated driver to the PWM1 and PWM2 signal and couple to the other power units in parallel.

Since each driver 508-1, 508-2 . . . 508-N receives the same PWM1 and PWM2 signals, matching between each power unit 102-1, 102-2 . . . 102-N is as good as the matching of the physical elements of each power unit, e.g., the inductors, transformers, transistors, resistors of each. Since control signals LDR1, LDR2, HDR1, and HDR2 from each driver are provided in response to the same PWM1 and PWM2 signals, the delays between power stages, e.g., the length of various time intervals T2 and T4 may also be matched. This may also prevent current flowing from one power unit's output to another since the conduction periods, e.g., time intervals T1 and T3, are also consistent. As such, the tolerances of the components of each power unit may be involved only as a percentage matching error since the zero load condition may be free of additional offset current between outputs of each power unit.

The current sensing schematic of FIG. 5 may utilize a summing resistive network in a differential topology to cancel any ground potential offsets between each power unit. Each section of the resistive network corresponding to one power unit may utilize a high side balancing resistor (Rhigh_1 . . . Rhigh_N) and a low side balancing resistor (Rlow_1 . . . Rlow_N). In one embodiment, all the high side balancing resistors (Rhigh_1 . . . Rhigh_N) and all the low side balancing resistors (Rlow_1 . . . Rlow_N) may be of equal value. The voltage between node 528 (CSP node) and node 530 (CSN node) is the instantaneous average value of the voltages developed across the N sensing resistors (R_SENSE_1 . . . R_SENSE_N) as given by equation (1), where N is the number of power units 102-1, 102-2 . . . 102-N.

$$V_{CSP} - V_{CSN} = \frac{V_{RSENSE\_1} + V_{RSENSE\_2} + \ldots + V_{RSENSE\_N}}{N} \quad (1)$$

Advantageously, the transient response speed of the embodiment of FIG. 5 is relatively fast compared to DC to DC converter having a single stage power unit due to the N times lower output equivalent inductance, where N is the number of power units. If all transformers for each power unit are substantially identical, the voltages applied across all the inductors is also equal. In addition, all the inductors are in parallel so the equivalent inductance will be N times lower. The output current ramping capability during load transients will also be N times higher.

There is thus provided a power converter comprising a transformer having a primary winding and a secondary winding, and a plurality of switches coupled to the primary and second winding. The plurality of switches are responsive to at least one control signal to short both the primary and secondary winding during a first reset time interval. For example in one embodiment, during time intervals T2 and T4, switches S1 and S2 may be OFF, switches S3 and S4 may be ON for the power converter 102 of FIG. 2. As such, the primary winding 206 of the transformer may be shorted via closed switches S3 and S4. In addition, the secondary winding 208 may also be shorted through closed switches S5 and S6. As such, the transformer 202 requires a smaller core 210 and the magnetic characteristics of the core are kept reasonably far away from saturation. In addition, there is also provided an electronic device with a similar power converter. There is also thus provided a method of sampling an input voltage onto a primary winding of a transformer during a first time interval, and shorting the primary winding of the transformer during a second time interval.

There is also provided a power converter comprising: a full bridge circuit having a first path and a second path, each path comprising a high side and low side bridge switch connected in series, each path having a node between the high side and low side bridge switches, and each path coupled to an input voltage terminal. The power converter may also comprise a transformer having a primary winding and a secondary winding, the primary winding being coupled between the nodes of the paths of the full bridge circuit. The power converter may also comprise a rectifier circuit coupled to the secondary winding, the rectifier circuit comprising a first and second rectifier switch, the first rectifier switch coupled to one end of the secondary winding, the second rectifier switch coupled to an opposite end of the secondary winding. The low side switch of the first path and the first rectifier switch may be simultaneously driven by a first control signal and the low side switch of the second path and the second rectifier switch may be simultaneously driven by a second control signal.

For example in one embodiment, control signal LDR1 may simultaneously drive low side switch S3 of path 170 and switch S5 of rectifier circuit 205. Control signal LDR2 may simultaneously drive low side switch S4 of path 172 and switch S6 of rectifier circuit 205. Therefore, only four control signals LDR1, LDR2, HDR1, and HDR2 are necessary to drive six switches. The nature of the control signals also enables them to be driven by common drivers that are readily available and inexpensive. One such driver may be a dual MOSFET driver when the switches S1 to S6 are implemented as MOSFET transistors.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:

providing a first control signal to control a state of a first high side switch coupled to a first path of a full bridge circuit;

providing a second control signal to control a state of a second high side switch coupled to a second path of said full bridge circuit, said full bridge circuit coupled across a primary winding of a transformer;

providing a third control signal to simultaneously control a state of a first low side switch coupled to said first path of said full bridge circuit and a state of a first rectifier switch of a rectifier circuit over an entire operating cycle, said first rectifier switch coupled to one end of a secondary winding of said transformer; and providing a fourth control signal to simultaneously control a state of a second low side switch coupled to said second path of said full bridge circuit and a state of a second rectifier switch of said rectifier circuit over said entire operating cycle, said second rectifier switch coupled to an opposite end of said secondary winding of said transformer.

2. The method of claim 1, further comprising:

shorting said primary winding during a first time interval by closing said first low side switch of said first path of said full bridge circuit and by closing said second low side switch of said second path of said full bridge circuit during said first time interval.

3. The method of claim 2, further comprising:

shorting said secondary winding during said first time interval by closing said first rectifier switch and by closing said second rectifier switch during said first time interval.

4. A power converter comprising:

a full bridge circuit having a first path and a second path, each path comprising a high side and low side bridge switch connected in series, each path having a node between said high side and low side bridge switches, and each path coupled to an input voltage terminal;

a transformer having a primary winding and a secondary winding, said primary winding being coupled between said nodes of said paths of said full bridge circuit; and a rectifier circuit coupled to said secondary winding, said rectifier circuit comprising a first and second rectifier switch, said first rectifier switch coupled in series to said low side switch of said first path and to one end of said secondary winding, said second rectifier switch coupled in series to said low side switch of said second path and to an opposite end of said secondary winding; and a controller configured to provide a first and a second control signal, wherein said low side switch of said first path and said first rectifier switch are simultaneously driven by said first control signal and said low side switch of said second path and said second rectifier switch are simultaneously driven by said second control signal over an entire cycle of said power converter.

5. The power converter of claim 4, wherein high side switches of said first and second paths are configured to open and said low side switches of said first and second paths are configured to close during a reset time interval to short said primary winding.

6. The power converter of claim 5, wherein said first and second rectifier switches are also configured to close during said first reset time interval to short said secondary winding during said reset time interval.

* * * * *